E. W. SIMMONS.
GAGE.
APPLICATION FILED NOV. 17, 1905.
919,786.
Patented Apr. 27, 1909.
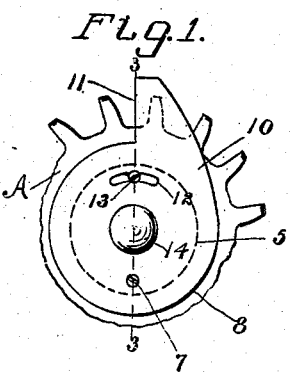
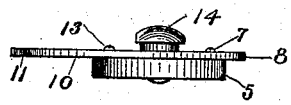
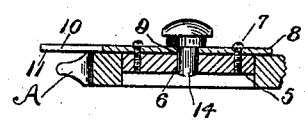
Witnesses
Raphael G. Blanc.
Frank Mahar.
Inventor
Eugene W. Simmons
By Henry J. Miller
Attorney.

UNITED STATES PATENT OFFICE.

EUGENE W. SIMMONS, OF MATTAPAN, MASSACHUSETTS.

GAGE.

No. 919,786.    Specification of Letters Patent.    Patented April 27, 1909.

Application filed November 17, 1905. Serial No. 287,824.

*To all whom it may concern:*

Be it known that I, EUGENE W. SIMMONS, of Mattapan, in the county of Suffolk and State of Massachusetts, have invented a new and useful Improvement in Gages; and I hereby declare that the following is a full, clear, and exact description of the same, reference being had to the accompanying drawings, forming part of this specification.

This invention has reference to improvements in gages for gaging the grinding of the cutting edges of gear cutters and other milling cutters.

One object of this invention is to so construct a gage of this nature that the lines of the cutting edges of the teeth of forming cutters may be indicated thereby.

Another object of the invention is to so construct a gage of this nature that the radial lines on which the cutting edges of the teeth of forming cutters are designed to be ground may be indicated thereby.

Another object of the invention is to so construct a gage of this nature, designed to indicate radial lines, that, by suitable adjustment, lines inclined to the radii may be indicated by said gage.

The invention consists in a gage having a hub adapted to be centered in the bore of the forming cutter, and rotatable therein, and having an indicator extending radially therefrom.

The invention also consists in a hub adapted to be centered by insertion into the bore of the forming cutter and having a radially extending indicator, or gage, adjustably mounted on said hub.

The invention also consists in such other novel features of construction and combination of parts as shall hereinafter be more fully described and pointed out in the claims.

Figure 1, represents a plan view of the improved gage, parts of a forming cutter being indicated in relation thereto. Fig. 2, represents an edge view of the cutter. Fig. 3, represents a sectional view thereof taken on line 3—3 Fig. 1, the center pin being shown in full.

Similar numbers of reference designate corresponding parts throughout.

It is desirable that the cutting edges of the teeth of milling cutters adapted for use in cutting gears, or as forming cutters for other work, should be uniformly ground usually with the lines of the cutting edges on radial lines from the axis of the cutter. At times however it is essential that the teeth of said cutters be ground on lines inclined to the radii to bring the cutting edges at the tops of the teeth in advance of the roots or bases of the teeth, or vice versa.

In carrying this invention into practice my desire has been to so construct a gage that it may be readily centered on the forming cutter and may be rotatable to successively indicate the lines on which the teeth should be ground thereby insuring uniformity in the cutting edges of the teeth.

In the drawings 5 indicates a circular hub, of a diameter to be rotatably received in the bore of the forming cutter to be ground, and having the axial perforation 6; pivotally secured to this hub 5, by the screw 7, is the gage plate 8 having the axial perforation 9 and the finger 10 having the straight edge 11 extending radially from the axis, in this plate 8 is formed the curved slot 12 through which extends the set screw 13 the end of which is secured in a screw threaded socket in the hub 5. A center pin 14 is also provided which, by its insertion through the perforations 9 and 6 of the gage plate 8 and the hub 7 effects the holding of axes of the hub and the plate in coincidence.

When it is desired to define radial lines on which the cutting edges of forming cutters are intended to be ground the center pin 14 is placed in position in the perforations 9 and 6 the screw 13 is then, preferably, set to hold the plate 8 and the hub 5 in axial registration. The hub 5 of the gage may now be inserted in the bore of a forming cutter of suitable size, indicated herein in part at A, and the edge 11 of the finger 10 will indicate a line extending radially from this axis of the forming cutter, and this line may be successively indicated for the grinding of all the teeth of the cutter by simply rotating the gage with respect to the cutter. When it is desired to indicate by means of the edge 11, lines which are inclined to the radii of the hub 5 the plate 8 is swung on the pivot 7 to the desired position with relation to the hub 5 and is secured in such position by the set screw 13.

Having thus described my invention, I claim as new and desire to secure by Letters Patent.

1. A gage, for indicating the proposed lines of grinding for the teeth of milling cutters, comprising a hub adapted to be rotatably mounted in the bore of the cutter and a radially extending gage having a larger diameter than the hub mounted on said hub.

2. A gage, for indicating the proposed lines of grinding for the teeth of milling cutters, comprising a hub adapted to be rotatably received in the bore of the cutter a gage plate adjustably mounted on said hub, and means for holding the axes of the plate and the hub in registration.

3. A gage, for indicating the proposed lines of grinding for the teeth of milling cutters, comprising a hub adapted to be rotatably received in the bore of the cutter, a plate pivoted on said hub and eccentrically of the latter having a gage line extending radially from the axis of said plate, and means for securing the plate to said hub against independent movement.

4. The combination with the hub 5 having the axial perforation, 6, of the plate 8 pivotally secured to the hub 5 and having the axial perforation 9 the finger 10 with its edge 11 and the curved slot 12, the screw 13 extending through said slot and secured in the hub 5, and the center pin 14 fitting the perforations 9 and 6 as and for the purpose described.

In testimony whereof I affix my signature in presence of two witnesses.

EUGENE W. SIMMONS.

Witnesses:
   H. J. MILLER,
   P. E. TONER.